(12) United States Patent
Chapman

(10) Patent No.: US 8,408,347 B2
(45) Date of Patent: Apr. 2, 2013

(54) CAMERA CAR

(75) Inventor: Leonard T. Chapman, North Hollywood, CA (US)

(73) Assignee: Chapman/Leonard Studio Equipment, Inc., North Hollywood, CA (US)

(*) Notice: Subject to any disclaimer, the term of this patent is extended or adjusted under 35 U.S.C. 154(b) by 129 days.

(21) Appl. No.: 13/033,891

(22) Filed: Feb. 24, 2011

(65) Prior Publication Data
US 2012/0217718 A1    Aug. 30, 2012

(51) Int. Cl.
*B62D 23/00* (2006.01)
(52) U.S. Cl. .................. 180/89.1; 280/756
(58) Field of Classification Search ............ 180/89.1, 180/311; 396/12, 419, 428; 248/207, 214; 352/132; 280/756
See application file for complete search history.

(56) References Cited

U.S. PATENT DOCUMENTS

| | | | | |
|---|---|---|---|---|
| 4,615,597 A * | 10/1986 | Burriss | | 396/428 |
| 4,645,320 A * | 2/1987 | Muelling et al. | | 396/419 |
| 4,851,753 A * | 7/1989 | Hamilton | | 318/609 |
| 5,212,655 A * | 5/1993 | Boehle | | 702/155 |
| 5,260,731 A * | 11/1993 | Baker, Jr. | | 396/428 |
| 5,835,808 A * | 11/1998 | Parker et al. | | 396/419 |
| 5,876,005 A * | 3/1999 | Vasconi | | 248/276.1 |
| 6,019,524 A * | 2/2000 | Arbuckle | | 396/427 |
| 6,142,437 A | 11/2000 | Wilkins, Jr. | | |
| 6,517,207 B2 * | 2/2003 | Chapman | | 352/243 |
| 6,579,016 B2 * | 6/2003 | Chapman | | 396/428 |
| 7,037,006 B2 * | 5/2006 | Chapman | | 396/428 |
| 7,311,452 B2 * | 12/2007 | Chapman | | 396/428 |
| 7,522,213 B2 * | 4/2009 | Chapman | | 348/373 |
| 7,770,767 B2 * | 8/2010 | Bartholdy | | 224/401 |
| 8,137,008 B1 * | 3/2012 | Mallano | | 396/427 |
| 2004/0129489 A1 * | 7/2004 | Brasseal et al. | | 180/350 |
| 2005/0030418 A1 * | 2/2005 | Hoffman | | 348/373 |
| 2005/0052531 A1 * | 3/2005 | Kozlov et al. | | 348/143 |
| 2009/0001764 A1 * | 1/2009 | Hoppenstein et al. | | 296/203.01 |

FOREIGN PATENT DOCUMENTS

| | | |
|---|---|---|
| EP | 0196247 A1 | 10/1986 |
| EP | 0635398 A1 | 1/1995 |
| EP | 1810721 A1 | 7/2007 |
| GB | 2345313 A | 7/2000 |
| WO | 2005085948 A1 | 9/2005 |

OTHER PUBLICATIONS

Product brochure for the Kawasaki TeryX Recreation Utility Vehicle (Jan. 2008).
European Search Report dated Jun. 1, 2012 in EP Application No. 12155914.0-1523.

* cited by examiner

*Primary Examiner* — Faye M. Fleming
(74) *Attorney, Agent, or Firm* — Kenneth H. Ohriner; Perkins Coie LLP

(57) ABSTRACT

A mobile camera vehicle has a roll cage or similar structure attached to a chassis. Upper and lower horizontal bars are attached to the vehicle structure. Front and rear vertical bars are each attached to the upper and lower horizontal bars. A lift plate is attached to and vertically moveable on the front and rear vertical bars. A lift plate actuator may be attached to the lift plate and used to raise and lower the lift plate on the front and rear vertical bars. Alternatively, the lift plate may be moved manually. A camera platform is supported on the lift plate. A vertical shock isolator may optionally be supported on the lift plate, and with a camera on the camera platform on the vertical shock isolator.

15 Claims, 3 Drawing Sheets

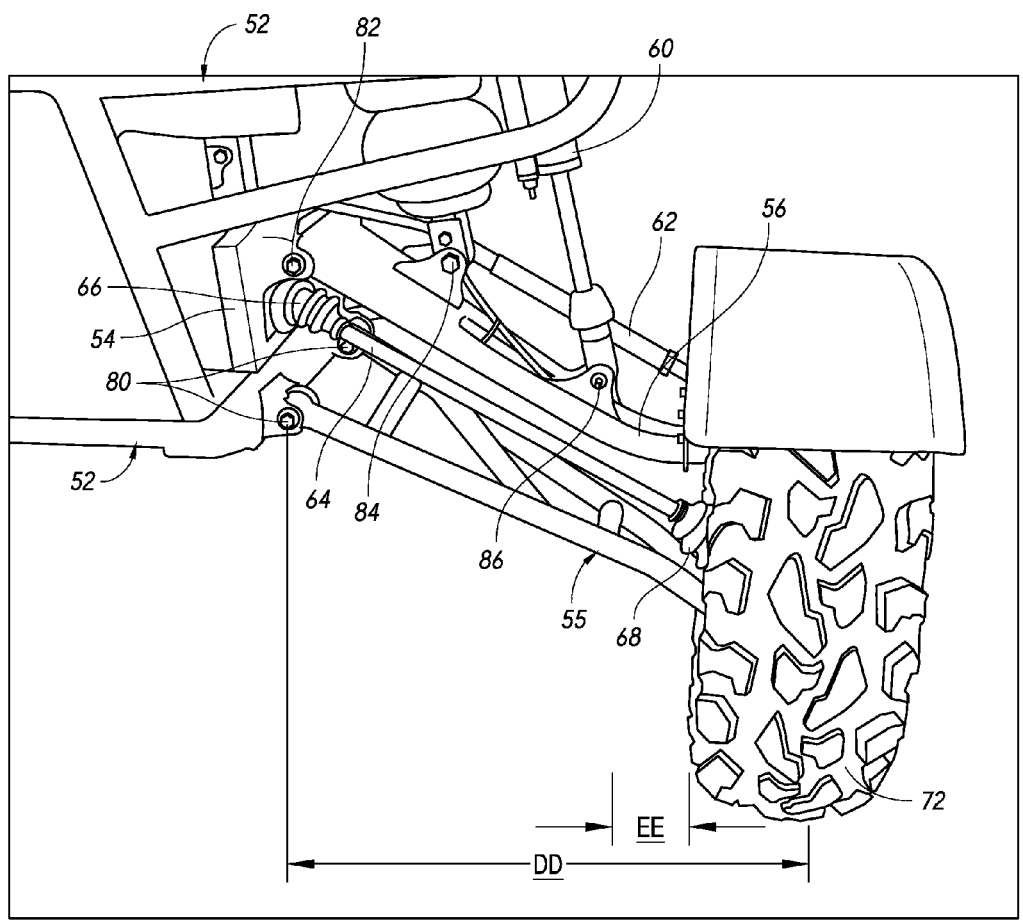

CAMERA CAR

BACKGROUND OF THE INVENTION

In the production of motion picture, television and video recordings, the camera must often be moved from one position to another. The camera movements may require a change in camera position, camera angle, or camera elevation. The camera movement must be performed smoothly, as even small amounts of shock and vibration of the camera can result in unsatisfactory filming, due to shaky or erratic recorded images. For certain film sequences, the camera must be continuously and rapidly moved to follow an action or moving sequence. In the past, various so called "camera cars" have been used for this purpose. Typically, these have been cars or more often trucks, having added on fixtures to hold a camera. While these known designs have met with varying degrees of success, engineering challenges remain in achieving improved performance and versatility. Accordingly, it is an object of the invention to provide an improved camera support vehicle.

This and other objects, features and advantages will become apparent from the following detailed description of several embodiments of the invention.

BRIEF DESCRIPTION OF THE DRAWINGS

In the drawings, the same element number indicates the same element in each of the views.

FIG. 3 is an enlarged front perspective view detail of the front wheel suspension of the camera vehicle shown in FIG. 1.

DETAILED DESCRIPTION OF THE DRAWINGS

Figure 1:
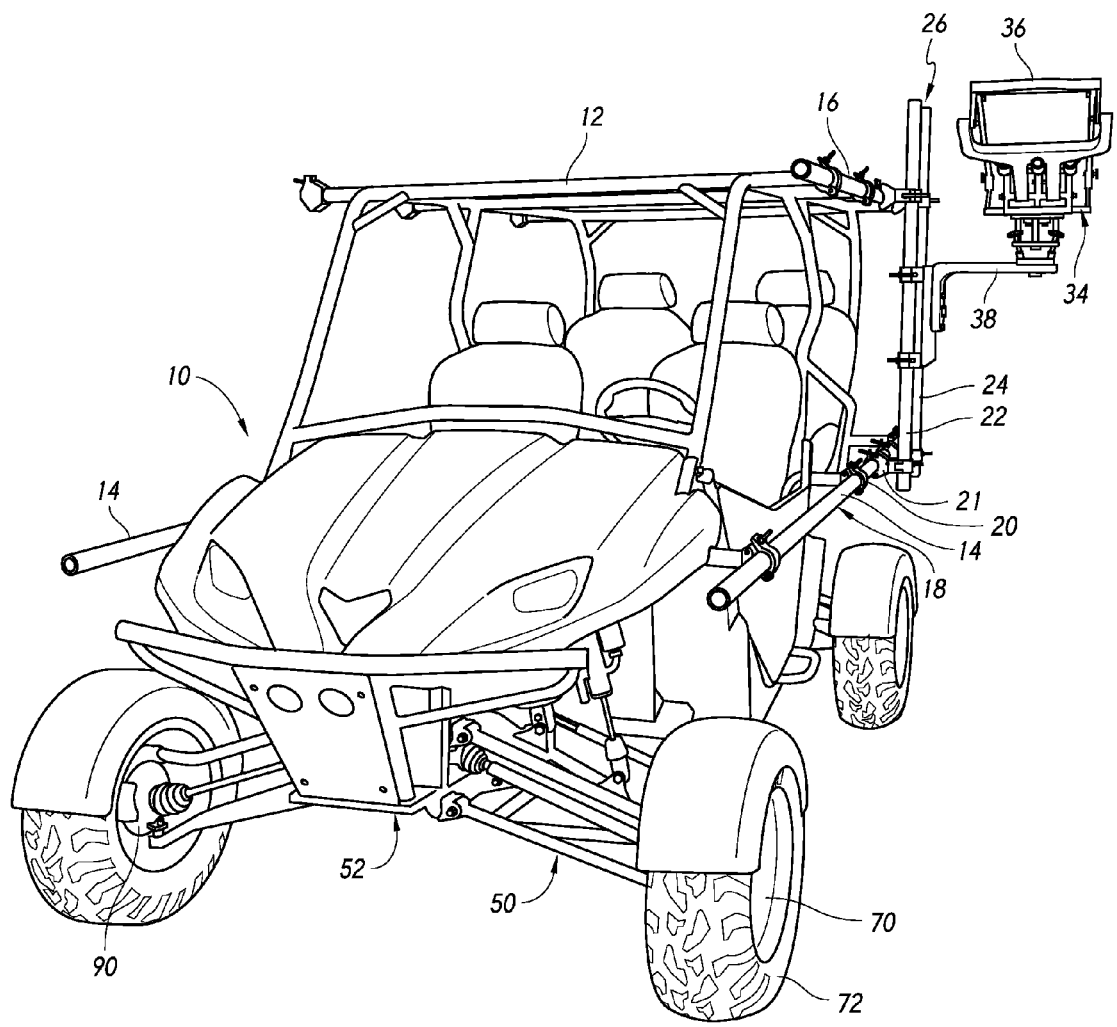
FIG. 1 is a front perspective view of my new mobile camera support vehicle.
Figure 2:
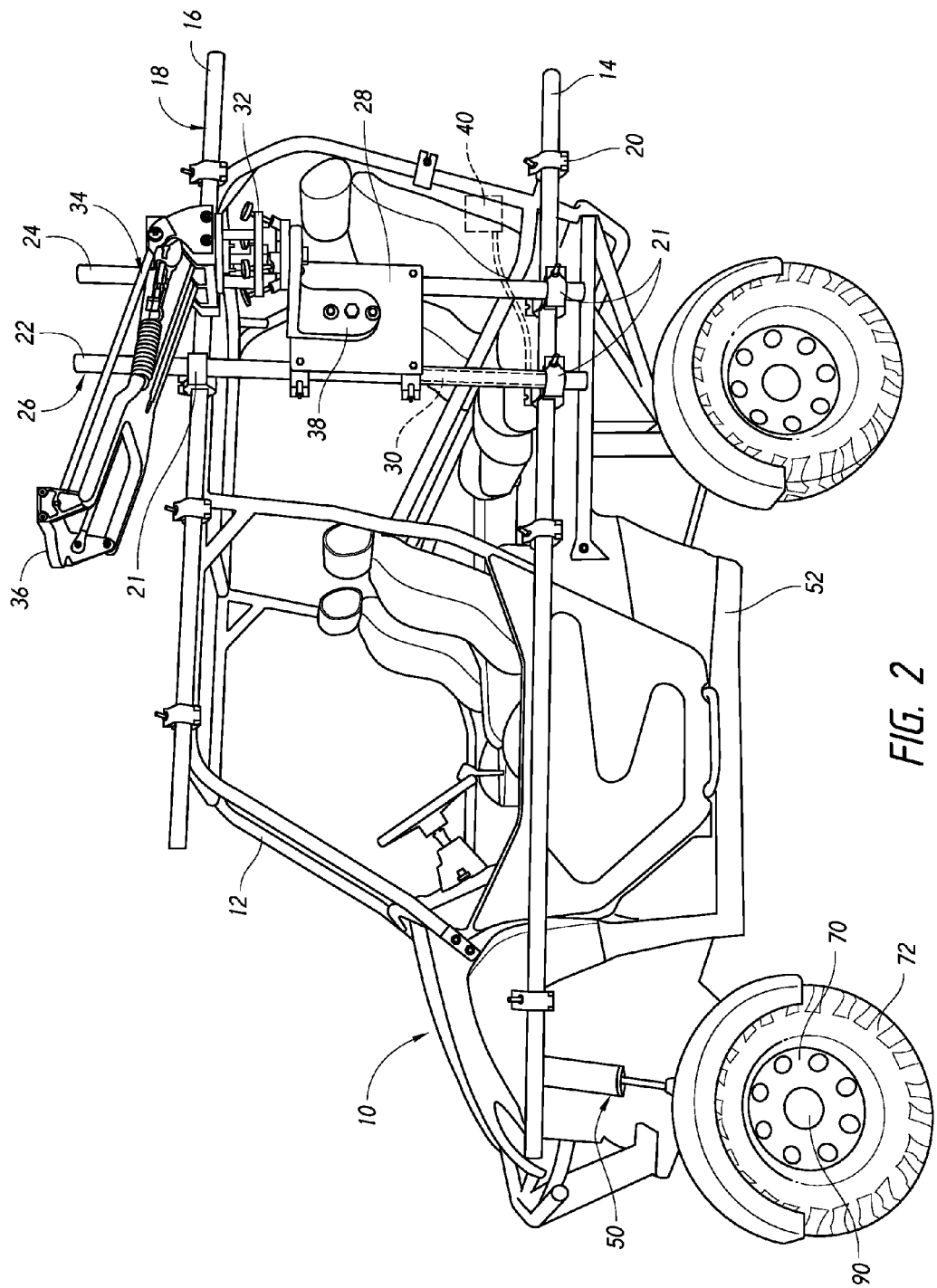
FIG. 2 is a left side view of the camera vehicle shown in FIG. 1.

Turning now in detail to the drawings, as shown in FIGS. 1 and 2, a vehicle such as a standard off-road vehicle or dune buggy is modified for use as a camera support vehicle 10. The vehicle 10 includes a roll cage 12 attached to a chassis 52. Upper and lower longitudinal bars 14 and 16 are attached to the roll cage 12, or to other structure of the vehicle 10. The bars 14 and 16 may be generally parallel to each other and horizontal (i.e., parallel to the ground). The bars 14 and 16 may be attached permanently or temporarily to the vehicle. In the specific example shown, the bars 14 and 16 are attached to the roll cage using bolt-on clamps 20, at three spaced apart locations on each bar 14 and 16. The lower bar 14 may be located at near the level of the drivers seat, with the upper bar 16 positioned 3-6 feet above the lower bar, adjacent to the roofline or top of the roll cage 12. While FIGS. 1 and 2 show an open-top vehicle, the concepts described here may be applied as well towards various other types of vehicles.

As best shown in FIG. 2, the lower and upper ends of front and rear vertical bars 22 and 24 are attached respectively to the lower and upper horizontal bars 14 and 16 via fittings 21. The fittings 21 may be pipe clamp types of fitting that may be loosened via a cam lever, bolt, or other device, to allow the vertical bars 22 and 24 to slide along the horizontal bars to a desired position, where the fittings are retightened to secure the vertical bars in place. Referring still to FIG. 2, a lift plate 28 is supported on the vertical bars 24 and 26. The lift plate 28 may be attached to the vertical bars using the fittings 21. A camera platform 36 is directly or indirectly supported on the lift plate 28. In the example shown in FIG. 2, an angle plate 38 is attached to the lift plate 28, a leveling head 32 is attached to the angle plate 38, and the camera platform 36 is provided on a vertical isolator 34. However, the angle plate 38, the leveling head 32 and the vertical isolator 34 are accessories that may be optionally used as desired. The vertical isolator 34, if used, may be provided as described in U.S. Pat. No. 7,522,213, incorporated herein by reference.

In use, the vertical bars 22 and 24 are moved to a desired longitudinal position along or on the horizontal bars 14 and 16 and are then secured in place using the fittings 21. The desired longitudinal position will vary depending on the nature of the camera shot, the position of the camera operator in or on the vehicle, and other factors. The lift plate 28 is vertically positioned as desired on the vertical bars 22 and 24 and is similarly secured in place, to locate the camera lens at the desired height. If used, the angle plate 38, leveling head 32 and vertical isolator 34 are attached onto the lift plate 28. The camera is then attached onto the camera platform 36. The vehicle 10 then provides a convenient mobile camera support. If an open top vehicle is used as shown in FIGS. 1 and 2, occupants of the vehicle can readily see the position of the camera and the surrounding environment. This helps to allow the camera operator, the cinematographer, the director, or others in the vehicle to visualize camera and subject positions. The driver of the vehicle is also able to better perceive the position of the camera in the surrounding environment. For example, in a shot where the vehicle is moving with the camera close to a wall or to the ground, the driver can better steer the vehicle to maintain the camera more precisely in position. As shown in FIG. 1, with the design described above, the camera is located closely alongside the vehicle 10. Monitoring and controlling the camera position is consequently more easily achieved. The risk of the camera inadvertently colliding with an object while the vehicle is moving is also reduced as the vehicle driver more intuitively perceives the position of the camera. Indeed, the entire camera may typically be supported within e.g., 30, 24 or 20 inches of the side of the vehicle. In this type of set up, the camera only projects laterally outwardly from the side of the vehicle nominally more than a large side-view mirror. The added weight and space requirements for the camera supporting structure are also minimal.

In an alternative design also shown in FIG, 2, a vertical actuator shown in dotted lines as element 30 may be associated with the lift plate 28. The vertical actuator 30 may be an electric, hydraulic or pneumatic actuator that lifts and lowers the lift plate 28 via a lift controller. The lift controller 40 may be a switch, lever, joystick, foot pedal, or other device that person in the vehicle may use to control the vertical actuator 30 to raise or lower the lift plate 28 correspondingly raising or lowering the camera. The lift controller 40 may be connect to the vertical actuator via a cable or via a wireless link. The vertical actuator may be on or inside of a vertical bar 22 and/or 24. Use of the vertical actuator 30 allows the camera height to be changed in real time, while the vehicle is moving, and while the camera is recording. For example, the vehicle may be moving with the camera lens close to the ground (worm-eye view), with the vehicle approaching a low obstacle, such as curb corner, prop, etc. An occupant of the vehicle can then control the vertical actuator to lift the lift plate and the camera up into a position to clear the obstacle. If wireless controls are used, the vertical actuator may also be controlled by an observer in a second vehicle or at a fixed location.

While FIGS. 1 and 2 show the bars and lift plate 28 on the left side of the vehicle, they may of course also be placed on the right side of the vehicle, or on both sides of the vehicle.

The horizontal bars 14 and 16 may also alternatively be attached to the front or back end of the vehicle, instead of the side of the vehicle as shown. Typically, the bars may be hollow round pipes, although other hollow or solid shapes may be used, including extruded shapes. Although the bars are described as horizontal and vertical, they need not be oriented at any specific precise angles, and do not necessarily have to be orthogonal to each other. The principals of the invention may also be used in designs having a single horizontal bar or plate and/or a single vertical bar or plate. The bars and plates may also optionally be integrally included in the roll cage or other vehicle structure, rather than as separate add-on components as shown in the drawings.

FIGS. 1 and 2 show an optional angle plate 38, leveling head 32 and vertical isolator 34 in an upright or overslung position. In the overslung position the camera is nominally vertically above the lift plate 28 (ignoring any temporary below nominal position resulting from movement of the vertical isolator). These accessories however may also be placed into inverted or underslung position, to achieve low camera angles.

The vehicle 10 may have a modified suspension assembly 50 at the left and right front and/or back wheels to provide an improved mobile support for a camera. As show in FIG. 3, an A-frame 55 is attached to the chassis 52 at lower inner pivot joints 80 and to an axle housing 90 at lower outer pivot joints (not shown). A control arm 56 is similarly attached to the chassis at upper inner pivot joints 82 and to the axle housing 90 at upper outer pivot joints (not shown). An adjustable/inflatable gas spring 58 is pivotally attached to the chassis 52 and to a top inner pivot connection 84 on the top of the control arm 56. The gas spring 58 may be connected to a compressed gas source, such as a nitrogen bottle. A control valve may then be used to increase or decrease the gas pressure within the spring, to change the spring constant to better match the ride conditions. A shock absorber 60 is pivotally attached to the chassis 52 and to a top outer pivot connection 86 on the top of the control arm 56. A tie rod 62 is pivotally attached to the axle housing 90 and linked to a steering system of the vehicle. An axle 64 connects the power train 54 to a wheel 70 and a tire 70 on the wheel 70. Bellows 66 and 68 cover constant velocity joints on the axle 64.

As shown in FIG. 3, the A-frame 55 and control arm 56 are extended laterally to position the tire centerline at a dimension DD from the pivot joints 80 and 82. This locates the tire to the outside of the chassis 52 of the vehicle 10. The inner sidewall of the tire 72 is also located outside of the chassis 52 by dimension EE. As shown in FIGS. 1 and 2, the tires 72 are positioned outwardly from the chassis, body, and any other components. This suspension design allows for an increased range of vertical motion of the tires, to better absorb shock impulses as the vehicle travels over uneven ground.

Thus, a novel camera vehicle has been shown and described. Various modifications may of course be made without departing from the spirit and scope of the invention. The invention, therefore, should not be limited, except by the following claims and their equivalents.

The invention claimed is:

1. A mobile camera platform, comprising:
   a four-wheel vehicle having a chassis;
   a roll cage attached to the chassis:
   a horizontal camera support frame including upper and lower horizontal bars attached to the roll cage;
   a vertical camera support frame including front and rear vertical bars each attached to the upper and lower horizontal bars;
   a lift plate attached to and vertically moveable on the front and rear vertical bars;
   at least one lift plate actuator connected to a lift controller and with the lift plate actuator attached to the lift plate and adapted to raise and lower the lift plate on the front and rear vertical bars; and
   a camera platform supported on the lift plate.

2. The mobile camera platform of claim I further comprising a vertical shock isolator on the lift plate, and with the camera platform on the vertical shock isolator.

3. The mobile camera platform of claim I with the vehicle having a laterally extended wheel suspension with the vehicle having tires positioned entirely outside of the chassis.

4. The mobile camera platform of claim 3 with the vehicle comprising a four-wheel drive vehicle.

5. A mobile camera platform, comprising:
   upper and lower horizontal bars attached to front and rear vertical bar supported on a vehicle having a chassis;
   a lift plate supported on the front and real vertical bars, with the lift plate slidable vertically along the front and rear vertical bars to a desired vertical position by an electric, hydraulic or pneumatic lift plate actuator; and
   a camera platform supported on the lift plate.

6. The mobile camera platform of claim 5 with the lift plate supported on the front and rear vertical bars via clamp elements, and with the lift plate actuator adapted to raise and lower the lift plate on the front and rear vertical bars when the vertical clamp elements are released.

7. The mobile camera platform of claim 5 with the front and rear vertical bars attached to the upper and lower horizontal bars via horizontal clamp elements, and with the camera platform moveable horizontally on the vehicle to a desired horizontal position temporarily releasing the horizontal clamp elements.

8. The mobile camera platform of claim 5 further comprising a vertical shock isolator on the lift plate, and with they camera platform on the vertical shock isolator.

9. The mobile camera platform of claim 1 with the vehicle having tires positioned entirely laterally outside of the chassis.

10. The mobile camera platform of claim 9 further comprising a wheel suspension assembly at front left and front right positions of the chassis, and with each wheel suspension assembly including an A-frame having an inner end pivotally attached to the chassis and an outer end pivotally attached to an axle housing, a control arm above the A-frame, with an inner end of the control arm pivotally attached to the chassis and an outer end of the control arm pivotally attached to the axle housing; an inflatable air spring attached to the chassis and to an inboard location of the control arm; and a shock absorber attached to the chassis and to an outboard location of the control arm.

11. A mobile camera platform, comprising:
   a four-wheel vehicle having a chassis;
   a roll cage attached to the chassis:
   a horizontal camera support frame including upper and lower horizontal bars attached to the roll cage;
   a vertical camera support frame including front and rear vertical bars each attached to the upper and lower horizontal bars:
   a lift plate attached to and vertically moveable on the front and rear vertical bars:
   at least one lift plate actuator attached to the lift plate and adapted to raise and lower the lift plate on the front and rear vertical bars;
   a camera platform supported on the lift plate;

with the vehicle having tires positioned entirely laterally outside of the chassis, and a wheel suspension assembly at front left and front right positions of the chassis, and with each wheel suspension assembly including an A-frame having an inner end pivotally attached to the chassis and an outer end pivotally attached to an axle housing, a control arm above the A-frame, with an inner end of the control arm pivotally attached to the chassis and an outer end of the control arm pivotally attached to the axle housing; an inflatable air spring attached to the chassis and to an inboard location of the control arm; and a shock absorber attached to the chassis and to an outboard location of the control arm.

12. The mobile camera platform of claim 11 further comprising a vertical shock isolator on the lift plate, and with the camera platform on the vertical shock isolator.

13. A mobile camera platform, comprising:
a four-wheel vehicle having a chassis:
a horizontal camera support frame including upper and lower horizontal bars, and a vertical camera support frame including front and rear vertical bars attached to the horizontal camera support frame, with the horizontal and vertical support frames supported on the chassis;
a lift plate attached to and vertically moveable on the front and rear vertical bars;
at least one lift plate actuator connected to a lift controller, with the lift plate actuator attached to the lift plate and adapted to raise and lower the lift plate on the front and rear vertical bars; and
a camera platform supported on the lift plate.
with the vehicle having tires positioned entirely laterally outside of the chassis, and a wheel suspension assembly at front left and front right positions of the chassis, and with each wheel suspension assembly including a lower support having an inner end pivotally attached to the chassis and an outer end pivotally attached to an axle housing, an upper support having an inner end pivotally attached to the chassis and an outer end pivotally attached to the axle housing; a spring attached to the chassis and to the upper support and a shock absorber attached to the chassis and to the upper support.

14. The mobile camera platform of claim 13 with the upper support comprising a control arm.

15. The mobile camera platform of claim 13 with the lower support comprising an A-frame.

* * * * *